March 29, 1960 F. M. GUY 2,930,211
FLEXIBLE COUPLING AND BUSHING CONSTRUCTION
Filed July 1, 1955 4 Sheets-Sheet 1
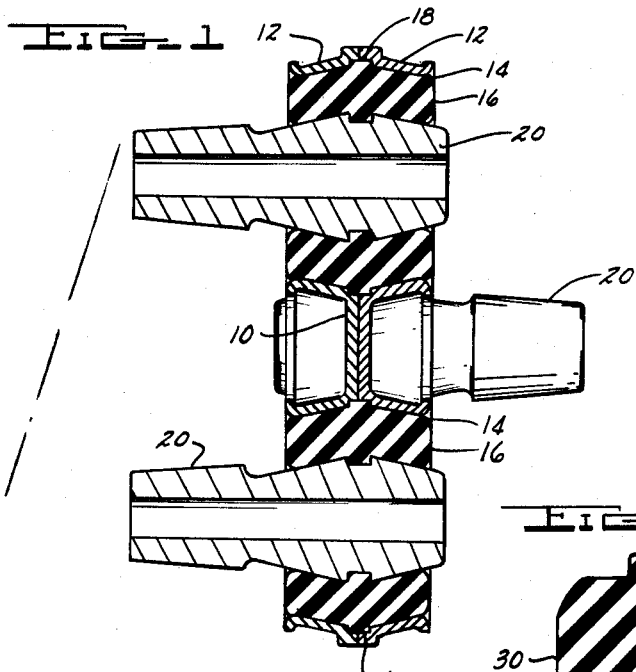
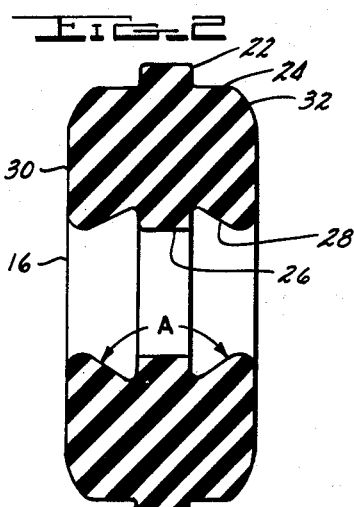
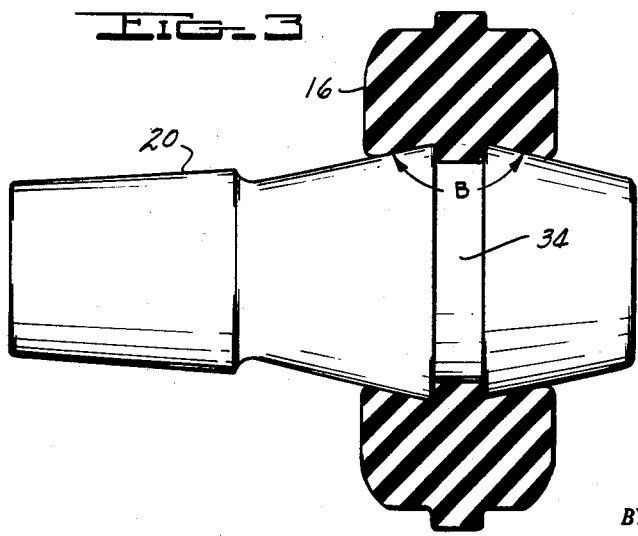
INVENTOR.
FREDERICK M. GUY
BY
SMITH, OLSEN & KOTTS
ATTORNEYS

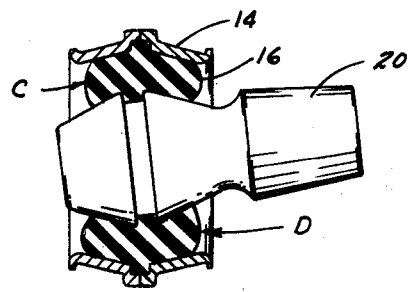
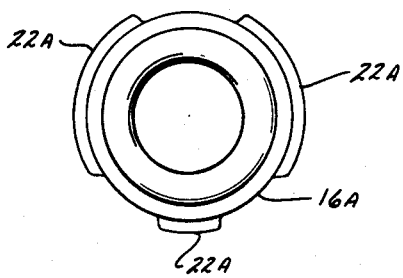
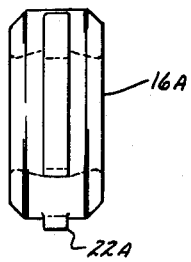
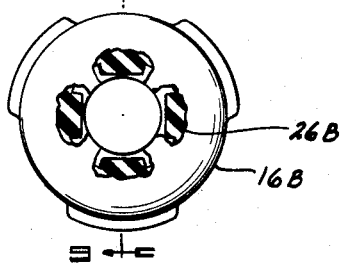
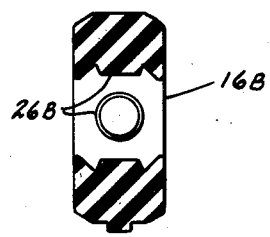
INVENTOR.
FREDERICK M. GUY
BY
SMITH, OLSEN & KOTTS
ATTORNEYS March 29, 1960 F. M. GUY 2,930,211
FLEXIBLE COUPLING AND BUSHING CONSTRUCTION
Filed July 1, 1955 4 Sheets-Sheet 3

INVENTOR.
FREDERICK M. GUY
BY
SMITH, OLSEN & KOTTS
ATTORNEYS

March 29, 1960 F. M. GUY 2,930,211
FLEXIBLE COUPLING AND BUSHING CONSTRUCTION
Filed July 1, 1955 4 Sheets-Sheet 4
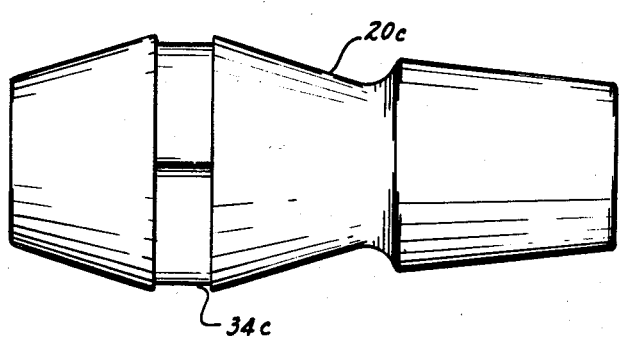
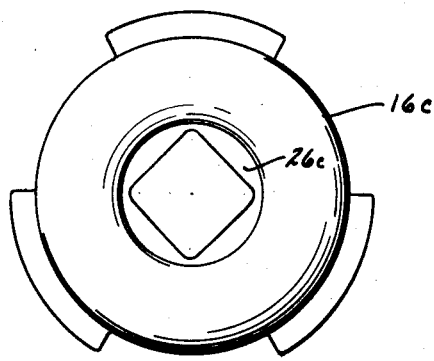
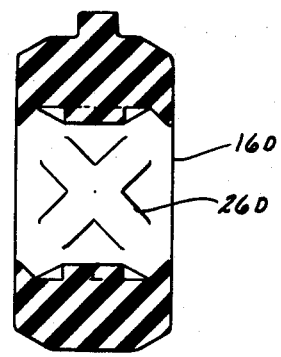
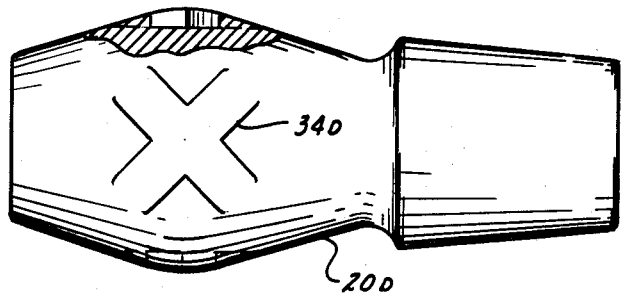
INVENTOR.
FREDERICK M. GUY
BY
SMITH, OLSEN & KOTTS
ATTORNEYS

United States Patent Office 2,930,211
Patented Mar. 29, 1960

2,930,211

FLEXIBLE COUPLING AND BUSHING CONSTRUCTION

Frederick Matthew Guy, Detroit, Mich., assignor to U.S. Universal Joints Company, Detroit, Mich., a corporation of Michigan Application July 1, 1955, Serial No. 519,440

10 Claims. (Cl. 64—11)

The present invention relates to improvements in flexible couplings and more particularly to improvements in a resilient bushing for use in such couplings.

Flexible couplings of the general type with which the present invention is concerned consist of a central member formed of complemental metal stampings and having shells or pockets formed therein to receive resilient bushings. Within each resilient bushing there is provided a central core with some of the cores projecting from one side of the shell member and some projecting from the other side so that the projecting ends of the cores may be connected through suitable structure to the ends of adjacent shafts to provide a flexible coupling between the shafts.

The present invention is concerned particularly with the provision of a new and novel resilient bushing for such coupling constructions which is adapted to carry the loads and strains applied to such couplings without rupturing or without losing its resiliency while at the same time allowing for maximum angular and longitudinal displacement of the connected shafts. This novel bushing is also so designed as to allow closer grouping of the bushings in the central member of the coupling thereby reducing the overall dimension of the coupling.

I have found that because of the loads and stresses to which the bushings in such flexible couplings are subjected, the cross sectional configuration of the resilient bushing is extremely important. This configuration must be such as to distribute the mass of the bushing in proper position between the core and the shell of the coupling and to assure that the bushing is properly pre-loaded to efficiently distribute the forces applied to the bushing over the greatest possible area thereby minimizing concentration of such forces at localized points which would tend to rupture the bushing.

The cross sectional configuration of the resilient bushing must also be such as to avoid scuffing and excessive wear of the bushing when the shafts connected by the flexible coupling are subjected to angular and longitudinal displacement.

The novel resilient bushing of the present invention is also provided with projections on the outer and inner peripheries thereof to engage in corresponding recesses in both the shell and the core of the coupling to provide a secure mechanical engagement between the parts of the flexible coupling. The arrangement of the projections on the outer periphery of the bushing is such that the bushings may be grouped much closer together in the central member of the coupling thereby reducing the overall dimension of the coupling without sacrificing strength.

Accordingly, it is one object of the present invention to provide a flexible coupling which is efficient in operation, and which is sturdy in construction so as to insure length and efficiency of operation.

Another object of the present invention is to provide a flexible coupling having pre-loaded resilient bushings therein so as to assure most effective distribution of loads and stresses over the greatest possible area of such bushings.

Still a further object of the present invention is to provide a resilient bushing for flexible couplings, which bushing is of proper cross-sectional configuration to effectively pre-load said bushing when it is assembled in said flexible coupling.

Another object of the present invention is to provide a resilient bushing for flexible couplings which bushing is of proper cross sectional configuration to avoid scuffing and excess wear of the bushing.

Still a further object of the present invention is to provide a resilient bushing for flexible couplings which has the proper cross-sectional configuration to distribute the mass of the bushing in proper position between the core and the shell of the coupling to obtain the most efficient use of said mass.

Another object of the present invention is to provide a flexible coupling wherein the resilient bushings are provided with integrally molded projections thereon engaged in corresponding recesses in the shell and core of the coupling.

A further object of the present invention is to provide a resilient bushing for use in a flexible coupling which bushing has integrally molded locking projections thereon arranged in such a way as to allow closer grouping of the bushings in the coupling than has heretofore been possible.

Other objects of this invention will appear in the following description and appended claims, reference being had to the accompanying drawings forming a part of the specification wherein like reference characters designate corresponding parts in the several views.

In the drawings:

Fig. 1 is a side view, partially in section of a portion of a flexible coupling embodying the present invention;

Fig. 2 is a cross sectional view of a resilient bushing embodying the present invention;

Fig. 3 is a side view partially in section showing the bushing of Fig. 2 in position on a core member prior to its complete assembly in the flexible coupling of Fig. 1;

Fig. 4 is a view, partially in section, of a bushing, core and associated shell of Fig. 1 with the shell and core in angular displacement;

Fig. 5 is a side view of one modification of the bushing shown in Figs. 1–3 wherein the locking projections on the outer periphery of the bushing are arranged to allow closer grouping of the bushing in a flexible coupling;

Fig. 6 is an end view of the bushing of Fig. 5;

Fig. 8 is a side view of another modification of the bushing of Figs. 1–3 with portions broken away to show modified locking projections on the internal periphery thereof;

Fig. 9 is a sectional view of the bushing of Fig. 8;

Fig. 11 is a side view of another modification of the bushing of Figs. 1–3;

Fig. 12 is a plan view of a modified core member for use with the bushing of Fig. 11;

Fig. 13 is a sectional view of another modification of the bushing of Figs. 1–3; and Fig. 14 is a plan view partially in section of a modified core member for use with the bushing of Fig. 13.

Figure 7:
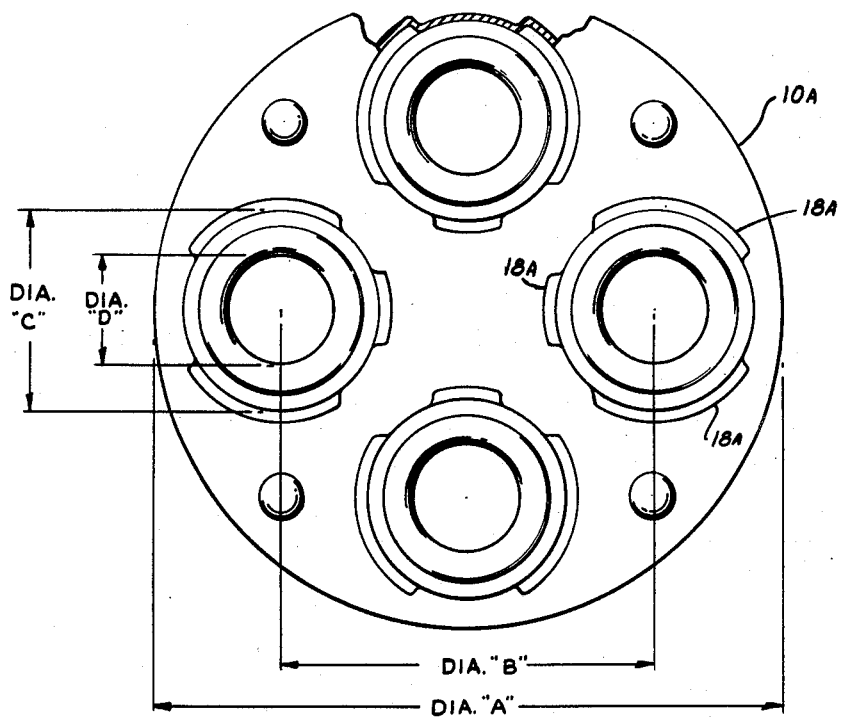
Fig. 7 is a plan view partially in section showing the bushing of Figs. 5 and 6 in position in the central member of a flexible coupling.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, Fig. 1 illustrates the central member of a flexible coupling embodying the present invention and having the resilient bushings and the core members assembled therein. The central member 10 is formed of a pair of complemental stampings 12 which are joined in any desired manner such as by welding or riveting. The stampings 12 (as can be seen more clearly in the modification illustrated in Fig. 7) are essentially disk-shaped and have a plurality of pockets formed therein. Each pocket in one stamping is aligned with a pocket in the other stamping to provide a plurality of shells 14 which receive resilient bushings 16.

The shells are formed to provide annular outer bead channels 18 in the periphery thereof for a purpose to be described hereinafter.

Within each shell there is provided a resilient bushing 16 and received axially within each resilient bushing is a core member 20. The core members 20 are provided with axial bores so that they may be affixed by means of bolts or the like through suitable structure to the ends of adjacent shafts.

In the embodiment illustrated in Fig. 1 I have provided four shells 14 equally spaced in a circular arrangement in central member 10. As shown, the shells are paired diametrically with the cores in one pair of shells projecting to the left of central member 10 and the cores in the other pair of shells projecting to the right. Each pair of cores can then be connected through appropriate structure to the end of a shaft so that a flexible coupling is provided between the adjacent ends of the shafts. It is to be understood that it is within the contemplation of the present invention to arrange the shells in central member 10 in other manners, such for example as providing one shell in the middle of the central member with two or more shells arranged in a concentric circle therearound.

Referring now to Fig. 2 of the drawings, one of the resilient bushings 16 is there shown in enlarged cross section in its free state. The resilient bushing is essentially annular and is provided with an outwardly projecting bead 22 on the outer periphery 24 thereof and an inwardly projecting bead 26 on the inner periphery 28 thereof.

As can be seen in Fig. 2, the resilient bushing 16 is essentially flat on the outer periphery 24 thereof with the bead 22 extending therefrom, the sides 30 are flat and perpendicular to the outer periphery 24. At the junction of the sides 30 with the outer periphery 24, the resilient bushing is tapered as illustrated at 32. The inner periphery 28 of the bushing is formed of faces which diverge from the centerline thereof. The included angle between these faces is indicated as A for reference hereinafter. All of the corners of the bushing formed by the junction of the faces thereof are rounded so that there are no sharp corners.

Referring now to Fig. 3 of the drawings, the resilient bushing 16 is shown in position on the core member 20. The core member 20 is provided with the annular groove 34 at the largest diameter thereof and the core is tapered both ways from its largest diameter. The included angle between these tapers is indicated as B and this angle is greater than the included angle A between the faces of the inner periphery 28 of bushing 16. Thus, it can be seen that when the core 20 is inserted into bushing 16, the inner periphery 28 of core 16 will be placed in tension. This tension on the inner periphery of bushing 16 is part of the pre-loading of the bushings in a flexible coupling embodying the present invention. In addition, the diameter of core 20 is greater than the inner diameter of bushing 16 so that the bushing is also stretched when it is placed on the core.

It will be noted also that the inner bead 26 of bushing 16 is positioned within the annular groove 34 provided on core 20. This construction gives a mechanical lock between the core 20 and the inner periphery of bushing 16. I have also found it desirable in most instances to supplement this mechanical locking feature by cementing the bushing to the core with a suitable adhesive. Other forms of locking means are also suitable for this mechanical locking feature such as those disclosed in my co-pending application, Serial No. 267,749, filed January 23, 1957, in the name of Guy and Saurer, now abandoned, and other constructions described hereinafter.

Referring again to Fig. 1 of the drawings, the inner diameter of the shell 14 is less than the outer diameter of the bushing 16 in its free state and as assembled on core 20. Thus, when the bushing 16 and the core 20 are assembled in the shell 14 of central member 10, the bushing 16 is compressed so as to be distorted from its original shape.

The assembling of the core and bushing with the shells 14 may be accomplished in any desired manner. One method is to first assemble the bushing on the core and then to force the core and bushing into the shells 14.

When the bushing 16 is assembled in shell 14, the outer bead 22 fits into the bead channel 18 in shell 14 to provide a similar mechanical locking feature as has been described in relation to inner bead 26 and groove 34 in core 20.

Because of the resilient nature of the bushing 16, the mass thereof is free to flow so as to distribute itself uniformly between the core 20 and the concentric shell 14.

However, the tensioning of the inner periphery of the bushing, as described above, plus the compression around the outer periphery, places compressional forces on the sidewalls of the bushing. I have found that this has a tendency to shift the concentration of forces from the middle of the mass of the bushing to the sidewalls thereof.

The placing of the sidewalls of the bushing in compression assures that the inner and outer peripheries of the bushing will always maintain contact with the core and shell of the coupling, respectively, over a wide area. This is especially illustrated in Fig. 4 of the drawings. Therein there is shown partially in cross section a single shell and associated bushing and core with the core and shell displaced angularly such as would result from an angular displacement of two shafts connected by the flexible coupling of Fig. 1. It will be noted that where the distance between the core and shell has been increased by this angular displacement, such as at C and D, the fact that the sidewalls of the bushing are under compression has held the bushing in close contact with the shell and core. That is, the bushing has not tended to pull away from the core and shell even though the space therebetween has increased. This means that the bushing can sustain high torsional stresses even though the shell and core are displaced angularly.

From the description of the pre-loading forces applied to the bushing 16 as set out above, it can be seen that the cross sectional configuration of the bushing in its free state is extremely important so as to properly distribute the mass of the bushing between the core and the shell. For example, tapering the sides of the bushing at their junction with the outer periphery, as indicated at 32 in Fig. 2 assures that the sides can, in effect, be "squeezed" outwardly when the bushing is assembled with the core and shell without concentration of mass of the bushing that would result if this corner were square.

The cross sectional configuration of the bushing also assures the distribution of the compressional and tensional forces discussed above when the bushing is assembled in the coupling.

I have found that the cross sectional configuration of the resilient bushing as disclosed herein, also prevents the scuffing of the bushing against the core and the shell. In addition, this configuration results in placing the inner periphery of the bushing in tension and the outer periphery in compression. This, in turn, I have found, most effectively distributes the loads applied to the bushing during use of the coupling and prevents such localization of these forces as would rupture the bushing.

Referring to Figs. 5-7 of the drawings, there is shown a modification of the resilient bushing of Figs. 1-4 which makes it possible to group the bushings closer together in the central member of a flexible coupling as shown in Fig. 7.

As shown in Figs. 5 and 6, the bushing 16A is provided with the circumferentially spaced locking projections 22A on the outer periphery thereof. As can be seen from Fig. 7, these projections are spaced circumferentially in an arrangement which allows the bushings to be closely grouped in the central member 10A of a flexible coupling. It will be noted from Fig. 7 that where the peripheries of the adjacent bushings are closest to each other, there are no locking flanges.

The central member 10A is formed in the same manner as the central member 10 of Fig. 1. However, the pockets which are stamped in each complemental stamping to form the shells 14A are formed to provide recesses 18A therein to receive the locking projections 22A of the bushing 16A. By eliminating the necessity of providing recesses similar to 18A at the points where the shells are closest to each other I have made it possible to form the shells closer together in the central member 10A.

At the same time, this construction shown in Fig. 7, allows me to increase the diameter B by as much as 25%, which increases the torque capacity of the coupling. It also allows me to make diameter C just as large as possible by just leaving enough space in the housing to separate the rubber bushings. The increase in diameter C also allows me to increase the diameter D of the core member which also contributes to an increase in the torque capacity of the coupling.

Figure 10:
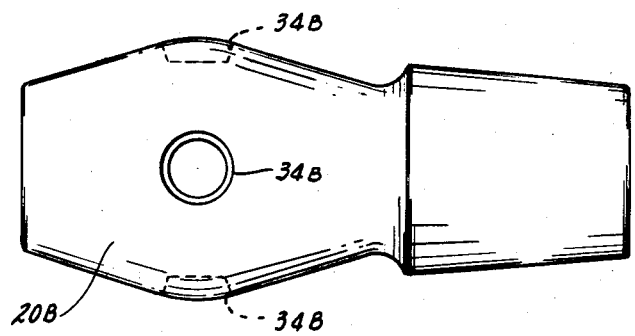
Fig. 10 is a plan view of a modified core member for use with the bushing of Figs. 8 and 9.

Referring now to Figs. 8 and 9 of the drawings, there is illustrated a bushing 16B having frusto-conical locking projections 26B extending inwardly from the inner periphery thereof. These locking projections are integrally molded with the bushing. The modified core member 20B illustrated in Figure 10 is provided with recesses in the outer circumference thereof to receive the locking projections 26B.

The locking projections 26B prevent both endwise and rotational movement of the bushing 16B on core 20B thereby reducing the scuffing to which the bushing is subjected and increasing its useful life as well as providing positive engagement between the core and the bushing to hold the same in assembled position.

Another modification of the resilient bushing of the present invention is shown in Fig. 11. Therein, the bushing 16C is provided with an inwardly projecting locking bead 26C on the inner periphery thereof. The bead 26C defines a rectilinear central opening in the bushing 16C. A modified core member 20C is shown in Fig. 12 for use with the bushing 16C of Fig. 11. The core member 20C is provided with a groove 34C in th circumference thereof which groove is of varying depth to define a rectilinear section on the core 20C to mate in the rectilinear central opening of the bushing 16C.

It is believed apparent that the locking head 26C therefore prevents both endwise and rotational movement of the bushing 16C on the core member 20C.

A further modification of the resilient bushing of the present invention is illustrated in Fig. 13. Therein the bushing 16D is provided with the X-shaped locking projections 26D on the inner periphery. For convenience I have illustrated four of these locking projections 26D although it is within the contemplation of the present invention to utilize less than four or more than four as desired.

A modified core member 20D is shown in Fig. 14 to receive the bushing 16D of Fig. 13. The core member 20D is provided with the X-shaped recesses in the circumference thereof to receive the locking projections 26D of the bushing 16D. It is believed apparent that the provision of these X-shaped locking projections on the bushing to engage in the corresponding recesses in the circumference of the core member will prevent both endwise and rotational movement of the bushing 16D on core 20D.

It has been proposed in some prior art constructions which utilize a resilient bushing disposed between a core member and a shell member concentrically spaced therefrom, to provide locking engagement between the bushing and the adjoining surfaces of the core member and the shell by scoring the core member and the shell and compressing the bushing into these score marks. I have found, however, that such a construction is not suitable for the purposes of the present invention because, under actual test of such constructions, the scored core and shell have chewed up the bushing and have not provided adequate mechanical locking features.

I have discovered that if I mold locking projections integrally with the resilient bushings and provide corresponding mating recesses in the core and shell members, that movement of the bushing relative to the shell and core is prevented. The molded locking projections are not chewed or sheared off when the core and shell are displaced relative to each other, and will withstand both torsional and endwise stresses applied to flexible couplings.

From the foregoing description of my invention, it can be seen that I have provided a novel resilient bushing for use in flexible couplings, which bushing is so designed to provide a cross sectional configuration that assures proper distribution of the mass of the coupling and proper preloading of the bushing to insure most effective distribution of the loads and stresses applied to the bushing.

It can also be seen that I have provided a resilient bushing construction which utilizes various locking projection constructions to prevent both endwise and rotational slipping of the bushing when assembled in a flexible coupling, thereby preventing scuffing of the bushing and prolonging its useful life as well as providing positive mechanical engagement between the assembled parts of the coupling.

Having thus described my invention, I claim:

1. In a flexible coupling including a central member having a plurality of shells therein, resilient bushings disposed within said shells and core members disposed within said resilient bushings, the improvements consisting of; said core member being tapered axially both ways from a major diameter thereof, and said resilient bushings being provided with faces on the inner periphery thereof diverging from the center thereof, the included angle between said diverging faces on said bushing in its free state being less than the included angle between said tapers on said core member so that upon assembly of said bushing on said core member with the center of said inner periphery enclosing the said major diameter of said core member the inner periphery of said bushing is pre-loaded in tension.

2. The improvements in a flexible coupling as claimed in claim 1 wherein locking means are provided on the inner periphery of said bushings to engage said core members and locking means are provided on the outer periphery of said bushings to engage said shells.

3. The improvements in a flexible coupling as claimed in claim 1 wherein projections are provided on the outer periphery of said bushings and engaged in corresponding recesses provided in said shells and projections are provided on the inner periphery of said bushings and engaged in corresponding recesses provided in said core member.

4. The improvements in a flexible coupling as claimed in claim 1 wherein said resilient bushings are provided with circumferentially spaced locking projections on the outer periphery thereof and corresponding recesses are provided in said shells to receive and locking projections on said bushings, said bushings being arranged in said central member with spaces between the locking projections at the points where the bushings are closest to each other.

5. The improvements in a flexible coupling as claimed in claim 1 wherein said resilient bushings are provided with frusto-conical locking projections projecting inwardly from the inner periphery thereof and said core members are provided with corresponding recesses in the circumference thereof to receive said locking projections.

6. The improvements in a flexible coupling as claimed in claim 1 wherein said resilient bushings are provided with annular beads on the inner periphery thereof defining a rectilinear central opening in said bushings and said core members are provided with an annular groove of varying depth in the circumference thereof to define a rectilinear section on said core mating with the rectilinear central opening in said bushing.

7. The improvements in a flexible coupling as claimed in claim 1 wherein said resilient bushings are provided with X-shaped locking projections on the inner periphery thereof and said core members are provided with corresponding mating X-shaped recesses in the circumference thereof.

8. A resilient bushing for assembly between a core member tapered axially both ways from a major diameter thereof and a shell member spaced concentrically from said core member, said resilient bushing being essentially annular and in its free state having faces on the inner periphery thereof diverging from the center thereof with the included angle between said faces being less than the included angle between said tapers on said core member, said bushing also having flat sides perpendicular to the axis thereof, an essentially flat outer periphery and tapered shoulder portions joining said sides with said outer periphery, all corners on said bushing being rounded and the outer diameter thereof being greater than the inner diameter of said shell member.

9. In a flexible coupling, a core member, a shell member spaced concentrically from said core member, and a resilient bushing positioned therebetween, said resilient bushing being essentially annular and provided with circumferentially spaced locking projections on the outer periphery thereof and corresponding mating recesses provided in said shell.

10. In a flexible coupling including a central member having a plurality of shells therein to receive a plurality of essentially annular resilient bushings, the provision of circumferentially spaced locking flanges on the outer periphery of said resilient bushings and corresponding mating recesses in said shells, said bushings and shells being arranged in said central member with spaces between said locking projections at the points where the bushings are closest to each other.

References Cited in the file of this patent

UNITED STATES PATENTS

| | | |
|---|---|---|
| 1,827,233 | Hughes | Oct. 13, 1931 |
| 1,978,939 | Guy | Oct. 30, 1934 |
| 2,297,483 | Kuhne | Sept. 29, 1942 |
| 2,326,451 | Fawick | Aug. 10, 1943 |
| 2,396,353 | Venditty | Mar. 12, 1946 |
| 2,622,418 | Howison | Dec. 23, 1952 |
| 2,636,360 | Guy | Apr. 28, 1953 |

FOREIGN PATENTS

| | | |
|---|---|---|
| 1,048,052 | France | July 29, 1953 |

(Corresponding U.S. 2,852,286, September 16, 1958)